(12) United States Patent
Griffiths et al.

(10) Patent No.: US 7,204,076 B2
(45) Date of Patent: Apr. 17, 2007

(54) ENGINE FUEL CONTROL

(75) Inventors: Michael Griffiths, Worcestershire (GB); Paul Bernard Green, Warwickshire (GB); Daniel James Bickley, Birmingham (GB)

(73) Assignee: Goodrich Control Systems Ltd., Shirley, Solihull (GB)

( * ) Notice: Subject to any disclaimer, the term of this patent is extended or adjusted under 35 U.S.C. 154(b) by 327 days.

(21) Appl. No.: 10/897,644

(22) Filed: Jul. 23, 2004

(65) Prior Publication Data
US 2005/0016176 A1 Jan. 27, 2005

(30) Foreign Application Priority Data
Jul. 25, 2003 (GB) .................... 0317394.5

(51) Int. Cl.
F02C 9/26 (2006.01)

(52) U.S. Cl. ..................... 60/39.281; 60/801

(58) Field of Classification Search ............... 60/39.24, 60/39.27, 39.281, 801
See application file for complete search history.

(56) References Cited

U.S. PATENT DOCUMENTS

| | | | |
|---|---|---|---|
| 4,487,181 A | 12/1984 | Moore et al. | 123/357 |
| 4,998,949 A | 3/1991 | Cantwell | 60/39.161 |
| 5,168,447 A * | 12/1992 | Moore | 701/99 |
| 5,212,943 A * | 5/1993 | Harris | 60/39.281 |
| 5,265,576 A | 11/1993 | McMahon et al. | 123/458 |
| 5,357,741 A * | 10/1994 | Talabisco et al. | 60/775 |
| 2001/0054290 A1 | 12/2001 | Herbison et al. | 60/734 |
| 2002/0099492 A1 | 7/2002 | Okawa et al. | 701/104 |
| 2003/0145834 A1 | 8/2003 | Buck et al. | 123/480 |

FOREIGN PATENT DOCUMENTS

| | | |
|---|---|---|
| DE | 19851797 A1 | 5/1999 |
| GB | 1 523 275 A | 8/1978 |
| WO | WO 97/23717 | 7/1997 |
| WO | WO 01/61175 A1 | 8/2001 |

OTHER PUBLICATIONS

European Search Report, Appn. No. 04254434.6, Goodrich Control Systems, 3 Pages, (Oct. 19, 2005).

* cited by examiner

*Primary Examiner*—L. J. Casaregola
(74) *Attorney, Agent, or Firm*—Wells St. John, P.S.

(57) ABSTRACT

An aircraft gas turbine engine fuel metering unit incorporating a memory device for storing data relevant to that unit, and an electrical connection arrangement whereby data can be read from and/or written to said memory device by an associated electronic engine controller, said stored data including data relating to at least one of the performance, the identification, the health, and the service life of that fuel metering unit. The invention further resides in an aircraft gas turbine engine fuel supply system and a method of operating such a system.

20 Claims, 1 Drawing Sheet

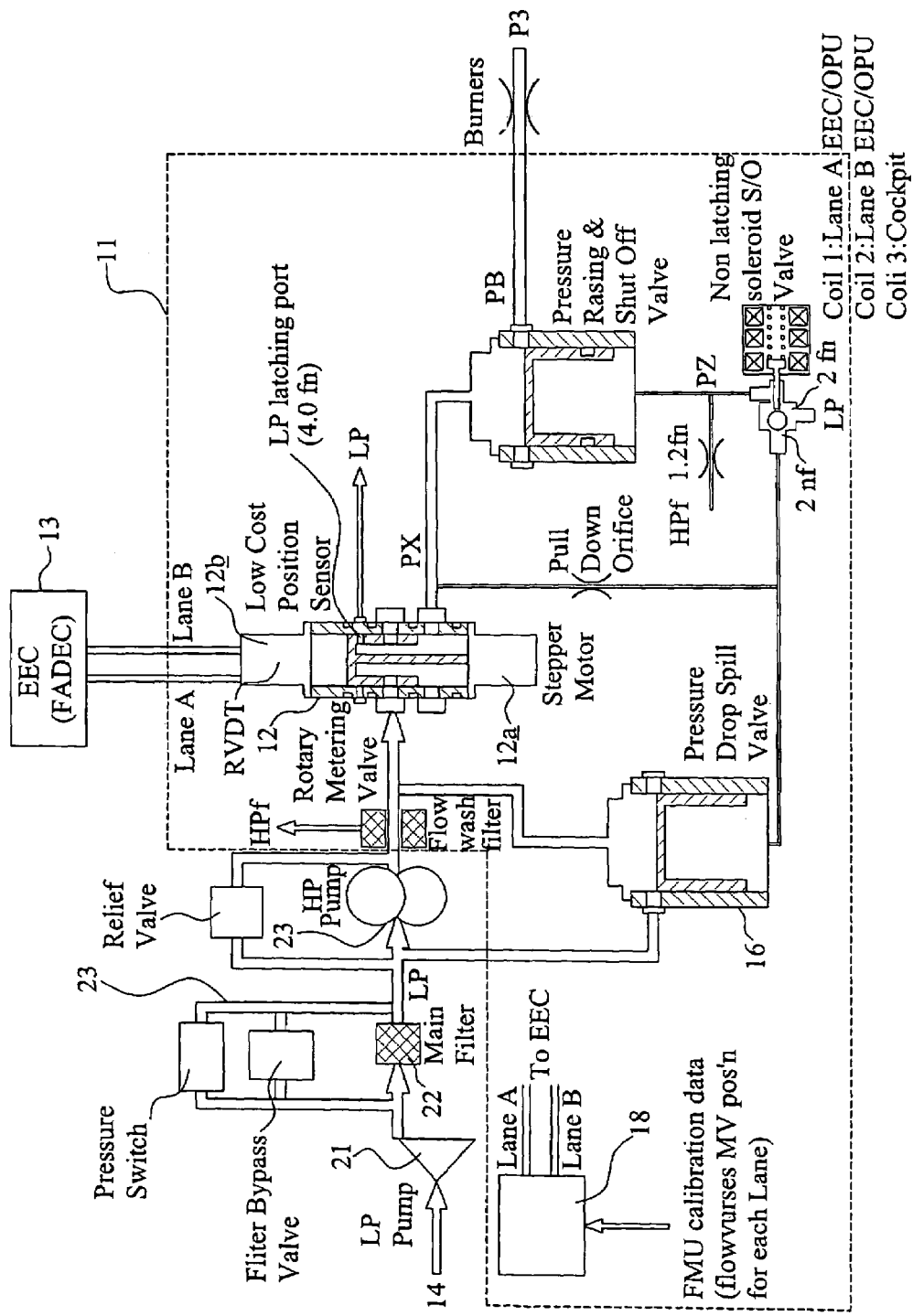

ENGINE FUEL CONTROL

PRIORITY CLAIM

This patent claims priority from an earlier filed Great Britain Patent Application No. GB 0317394.5, filed Jul. 25, 2003, for "Engine Fuel Control", by Michael Griffiths, Paul Bernard Green, and Daniel James Bickley.

TECHNICAL FIELD

This invention relates to a Fuel Metering Unit (FMU) for use in an aircraft gas turbine engine fuel supply system, and the invention also relates to a fuel supply system for an aircraft gas turbine engine utilising the FMU and to a method of operating the fuel supply system.

BACKGROUND ART

The term fuel metering unit (FMU) denotes a unitary component which receives fuel from a fuel supply and provides a controlled output of fuel to an engine in accordance with one or more control signals applied to the FMU by the Electronic Engine Controller (EEC) or, as it is frequently known in aircraft applications the Full Authority Digital Engine Controller (FADEC). In its simplest concept the FMU is a single fuel metering valve incorporating a motor or the like for driving the valve between open and closed positions and a position transducer which supplies to the EEC signals representative of the operative position of the valve. However, conventionally the FMU will include other control components in association with the metering valve such as, for example, a Pressure Drop Regulator and Spill Valve (PDSV) which controls the pressure drop across the metering orifice of the metering valve, and, a Pressure Raising and Shut Off Valve (PRSOV) which ensures a minimum system fuel pressure and can disconnect the engine from the metering valve when appropriate. In certain applications the FMU as described above may be an integral part of the fuel pumping arrangement of the fuel supply system.

In a conventional aircraft gas turbine engine fuel supply system the EEC is programmed with a predetermined fuel control law to which the FMU adheres. Thus the fuel control law will contain a predetermined table of FMU input signals to be supplied to the metering valve to vary the opening of the metering valve, so as to achieve predetermined flow values of the fuel supplied from the FMU to the engine. In order that the FMU can adhere to the EEC stored fuel control law the FMU is initially subjected to a detailed and rigorous calibration procedure during and after assembly, and before the FMU enters service. The calibration procedure is used to adjust the metering valve, and other components of the FMU when present, so that for a given fuel flow demand signal from the EEC a predetermined output of fuel from the FMU is achieved.

The calibration procedure for the FMU is time-consuming and therefore expensive. Typically calibration involves making adjustments, accurately shimming position sensors and springs, and may involve repeated assembly and disassembly of the FMU. Moreover, every FMU which is manufactured to suit a particular application must go through the same calibration process so that after calibration its performance characteristics are as close as possible to the performance characteristics of every other calibrated FMU for use in that application, and to the fuel control law stored within the EEC. In order to simplify the calibration of a large number of FMUs to be within close limits it is desirable to utilise, in the FMUs, metering valve position sensors which are all produced to a similar high level of accuracy. The same is also true of the devices which drive the metering element of the metering valve to set the opening of the valve and also the other valves associated with the metering process. Such accurately produced components are inherently expensive.

The aforementioned problems are exacerbated in so-called "dual-channel" control systems. In such a control system it is recognised that the mechanical components of the FMU are relatively robust, but that the electrical, and electromechanical components, notably the position transducer of the metering valve, are more susceptible to damage or failure, and in a dual channel arrangement a single metering valve will have two position transducers operating in parallel. Clearly both transducers should be as near identical as possible so that the performance of the FMU in relation to the signal supplied by the EEC is the same irrespective of which channel is operative. Clearly therefore the dual channel approach adds to both the equipment cost, and the time taken for calibration.

A further disadvantage of a conventional fuel control arrangement is that it is costly to make in-service changes. If a change is made to a conventional FMU design after the unit has entered service and this change affects the basic flow versus metering valve position calibration, it is very expensive to change the fuel control law software in all the in-service EECs. Also there would be the potential to miss-match EECs having the amended control law with pre-modification standard FMUs. It is therefore usual to implement such design changes by modifying the FMU metering valve metering profile, so that modified FMUs will obey the unchanged fuel control law, and this can often be difficult and expensive to achieve.

Irrespective of the calibration disadvantages described above there are some maintenance disadvantages associated with conventional FMU's. In particular, when an FMU is removed from an engine fuel supply system for maintenance purposes it is necessary to associate with the FMU a hard copy print from the associated EEC of any fault identifier codes which have been stored by the EEC in relation to that FMU during its use. Alternatively a manually created service log will need to be consulted so that the maintenance operative can be made aware of service life data of the FMU.

It is a primary object of the present invention to provide an FMU, and engine control system utilising an FMU, in which the aforementioned disadvantages are minimised or obviated.

DISCLOSURE OF THE INVENTION

In accordance with a first aspect of the present invention there is provided a fuel metering unit (FMU) for an aircraft gas turbine engine, incorporating a memory device for storing data relevant to at least one of the performance, the identification, the health and the service life of that FMU, and an electrical connection arrangement whereby data can be read from and/or written to said memory device in use by an associated electronic engine controller.

As used herein "Performance" data includes data related to the calibration of the FMU, that is a fuel control, or fuel flow, law which relates fuel flow through the FMU to the operative position of flow control components of the FMU;

"Identification" data includes a unique serial number containing inter alia manufacturing, specification, and build identifiers;

"Health" data includes fault codes and prognostic data relating for example to pump leakage and/or filter pressure drops;

"Service" data includes run hours and maintenance history.

Preferably the memory device stores calibration data of the FMU.

Additionally, or alternatively, the memory device stores service data of the FMU.

Conveniently said service data includes fault codes written to the FMU by the associated EEC and readable from the memory device during maintenance of the FMU remote from the EEC.

Alternatively or additionally said service data comprises the cumulative hours of operation of the FMU written to the memory device during operation of the FMU, by the associated EEC, and readable from the memory device during maintenance of the FMU remote from the EEC.

Preferably the memory device additionally stores a code identifying its FMU.

In accordance with a second aspect of the present invention there is provided an aircraft gas turbine engine fuel supply system incorporating an FMU as specified in any one of the preceding paragraphs and an EEC so connected to the FMU as to be able to read from and/or write to said memory device.

Preferably said memory device stores calibration data of the FMU and can be read by the EEC.

In accordance with a further aspect of the present invention there is provided a method of operating an aircraft gas turbine engine fuel supply system as defined in the preceding paragraph in which the calibration data stored by the memory of the FMU is read by the EEC when the fuel supply system is initialised and is used by the EEC as the fuel control law for operation of the FMU.

It will be recognised that in a method as specified in the preceding paragraph the EEC derives its fuel control law from the FMU, and thus each possible FMU for use in that application will carry its own fuel control law and the problems of FMU calibration are thus minimised or obviated, leading to significant cost savings.

Preferably the EEC fuel control law is updated by the calibration data stored in the memory device of the associated FMU each time the fuel supply system is initialised.

Alternatively, the memory device of the FMU also stores identification data of the FMU and upon initialisation of the fuel supply system the EEC first checks that the associated FMU is the one in respect of which its fuel control law was previously updated, and if the FMU is recognised then the EEC utilises the fuel control law stored therein from a previous initialisation, but in the event that the FMU is not recognised then the EEC reads the calibration data stored in the memory device of the FMU and uses the data read from the memory device to update its fuel control law.

Preferably during operation the EEC writes service data to the memory device of its associated FMU.

In accordance with a still further aspect of the present invention there is provided a method of manufacturing an aircraft gas turbine engine fuel metering unit (FMU) comprising assembling the FMU from components whose individual characteristics allow the assembled FMU to have operating characteristics falling within a predetermined band of acceptable characteristics, incorporating a memory device into the FMU, testing to establish the FMU operating characteristics, and storing data representative of those characteristics in the memory device of the FMU to be read by an associated electronic engine controller (EEC) in use to modify the control regime of that EEC to suit that FMU.

Desirably the data stored in the memory device is established by testing during and/or after assembly of the FMU.

BRIEF DESCRIPTION OF THE DRAWING

One example of the invention will now be described with reference to the accompanying drawing which is a diagrammatic representation of part of an aircraft gas turbine engine fuel supply system.

PREFERRED MODE FOR CARRYING OUT THE INVENTION

Referring to the drawing, it can be seen that the engine fuel supply system includes a Fuel Metering Unit (FMU) 11 comprising the components shown within the broken line boundary in the drawing. In its simplest configuration the FMU comprises only a fuel metering valve 12 which can be operated by an associated EEC or Full Authority Digital Engine Controller (FADEC) 13 to meter the quantity of fuel supplied from a fuel supply 14 to the burners 15 of an associated gas turbine engine. However in most practical embodiments the FMU will include other components as shown in the drawing, including a Pressure Drop Regulator and Spill Valve (PDSV) and a Pressure Raising and Shut Off Valve (PRSOV) as shown at 16 and 17 respectively in the drawing.

Although in the illustrated arrangement the high pressure pump 23 is shown as an element separate from the FMU 11, in some applications the pump may be physically combined with the FMU.

In the arrangement illustrated the PDSV 16 controls the pressure drop across the metering profile or orifice of the metering valve 12, and the PRSOV 17 ensures that there is a minimum system fuel pressure before fuel is supplied to the burners 15, and can, in appropriate circumstances, be used to disconnect the burners 15 from the metering valve 12. As will be understood by the skilled man the exact architecture of the FMU is not of particular relevance to the present invention, and the internal constituents of the FMU may differ dependent upon the application for which the FMU is designed. However, irrespective of the nature of the FMU, in accordance with the various aspects of the present invention, the FMU includes a memory device 18 for storing data associated with the FMU. Again as will be recognised by the skilled man the memory device may take a number of forms, but generally will be a solid state memory device, conveniently an EEPROM. However, irrespective of the specific nature of the memory device 18, the memory device is incorporated within the structure of the FMU, and so is integral to the FMU. More particularly, the FMU will include an external housing having an input port through which fuel enters the FMU, and an output port from which fuel exits the FMU to the burners 15. The memory device 18 is within, or secured to, the housing of the FMU. In other applications where the FMU is an integral part of the pumping arrangement then the FMU effectively includes the fuel pump and the memory device 18 may in such applications be located on the pump casing. Thus additionally pump fault codes and other data related to the pump may be stored within the unit.

In some applications the stored data may be data related to or representative of the health of the unit or of a component part of the unit. In applicants co-pending patent applications derived from British Patent Application GB0317449.7 there is disclosed monitoring pressure drop across a fuel filter and such prognostic data is an example of "Health" data which could be stored in the memory device 16 of the present unit.

The metering valve 12 of the FMU incorporates a drive device 12a for moving the metering element of the metering valve 12 to adjust the metering orifice of the valve, and thus to adjust the fuel flow through the valve, in accordance with command signals from the EEC 13. Additionally the metering valve includes a position sensor 12b which supplies position signals from the metering valve 12 to the EEC 13 identifying the physical position of the metering element of the valve 12. In the example illustrated in the accompanying drawing, the device 12a is an electrically operated stepper motor and the position sensor 12b is a Rotary Variable Differential Transformer (RVDT), the valve 12 being a rotary valve. However, in some applications the metering valve 12 will be a linear valve and the RVDT can be replaced by an LVDT, the stepper motor 12a being replaced by a linear actuator, either an electrically powered linear actuator, or an hydraulically powered linear actuator controlled by an electrically controlled valve. The accompanying drawing shows that the RVDT is a dual-channel device in that effectively it is two RVDT's operating in parallel, each supplying data along a respective "lane" to the EEC. As is apparent from the drawing the memory device 18 also connects into the data buses constituting the two lanes identified in the drawing as lane A and lane B and so is connected to the EEC when the FMU is in use. Two memory devices acting in parallel may be provided to enhance electrical redundancy if required.

Considering a conventional fuel supply system in which the FMU does not include the memory device 18 then the EEC holds the fuel control law which determines the position to which the metering element of the valve 12 must be moved from its current position to achieve a predetermined fuel flow through the burners 15. This law is predetermined, and is stored in the EEC and is a common law used to control all FMUs which may be used in that application. The FMU is calibrated during and after assembly, (and after some maintenance operations) so that its performance conforms to the law stored in the EEC in that it will provide a predetermined fuel output when its metering element is moved to a predetermined position in response to a corresponding command signal from the EEC. All other FMUs for use in the same application will be similarly calibrated, and where the FMU incorporates dual-channel technology then the calibration will ensure that the position signals transmitted along both lanes are substantially identical.

A typical FMU will include several components which require calibration and the necessary calibration adjustments, each of which may affect the calibration of another, will include, adjustment of a low flow adjuster, a pressure drop spring pre-load adjustment, and LVDT datum adjustments. The provision of such calibration items and their inter-relationship is well known to the skilled aircraft fuel systems engineer. Such an engineer will recognise that the inter-action of these adjustments will include, for example, that adjustment of the pressure drop pre-load to achieve a predetermined flow in one FMU operating condition may require re-setting of the LVDT datum adjustment to compensate for the effect on flow of the pre-load adjustment, in other FMU operating conditions. The calibration of an FMU, even a relatively simple FMU, is an iterative process which is both time consuming and expensive. While there is a large number of possible adjustment calibrations, there is only a limited number of combinations which produce the overall calibration requirements of the FMU across the whole operating range of the FMU. As mentioned previously in known FMUs for use in a given application it is necessary to calibrate all of the FMUs for that application to produce exactly the same operating performance so that any one of the FMUs for that application can be used with any one of the EECs for that application. Attempts have been made to simplify calibration by the use of matched components produced with very high accuracy, but nevertheless expensive and time consuming calibration is still required and the overall cost of the FMU is increased significantly by the use of expensive matched, high accuracy components.

In accordance with the present invention FMUs can be assembled from a standard range of components so producing FMUs whose operating characteristics lie somewhere within a relatively broad range of acceptable characteristics. Each assembled FMU can be tested during and/or after assembly and its "calibration characteristics" can be stored in the dedicated memory device of that FMU and then, when the FMU is in use, the stored data can be supplied to the associated EEC to modify or replace the fuel control law which the EEC uses to operate the FMU in use. It will be recognised therefore that it is necessary only to ensure that FMUs are assembled from components whose individual accuracy is sufficient to ensure that the assembled FMU will have characteristics lying within the broad acceptable band of characteristics. It will be understood that only FMUs within a narrow part of the broad acceptable band would be capable of use with the relevant EEC if the flow law of that EEC was not replaced or modified by the calibration data stored in the memory device of the FMU.

In the fuel supply system illustrated in the accompanying drawing the memory device 18 stores calibration data relevant to the FMU 11. Thus during and/or after manufacture of the FMU testing establishes "calibration data" relevant to that particular FMU. In effect the fuel control law of the FMU (the fuel output for a series of positions of the metering element) is determined by testing, and it is this data, conveniently referred to as calibration data, which is stored in the memory device 18. It will be possible to produce a testing apparatus which determines the operating characteristics of the FMU across its full working range and stores the data resulting from this testing directly in the memory device 18. It will be recognised therefore that each FMU will in effect carry, in its respective memory device 18, the fuel control law associated with that FMU, and the fuel control law of one FMU for use in a particular application may well differ from the fuel control law of an equivalent FMU for use in the same application. The use of a memory device in each FMU storing the particular calibration data of that FMU, allows the EEC with which the FMU is associated in use to be "updated" to utilize a fuel flow law specific to that FMU.

When the FMU is introduced into the fuel supply system, and the fuel supply system is first initialised then the EEC immediately interrogates the memory device 18 of the associated FMU and reads from the memory device 18 the stored data to provide a fuel control law relevant to that FMU. That FMU's fuel control law then is used as the fuel control law which the EEC utilises to control the fuel supply system.

In the event that during maintenance it is necessary to replace the FMU, then upon next initialisation of the system the EEC will read the fuel control law from the memory device 18 of the replacement FMU and will use that fuel control law to replace the stored fuel control law of the previous FMU. Thus although the two FMUs are not identical, no individual calibration is needed since the fuel control law which the EEC uses is the fuel control law derived from the FMU memory device, and not a standard fuel control law to which all FMUs must conform, as is currently the case.

It will be recognised that there are several different possible modes of operation. For example, the EEC can interrogate the memory device 18 so that the fuel control law of the EEC is checked, and if necessary updated, each time the EEC is initialised, or even at predetermined intervals during an operational period of the fuel supply system. However, more desirably the memory device 18 will also store identification data, for example a unique identifying serial number, relevant to the FMU. In such an arrangement, upon EEC initialisation, the EEC will check that the fuel control law which it has stored is the fuel control law of the FMU to which it is presently connected, and it will achieve this by interrogation of the identity data of the memory unit 18. If the EEC determines that the identity of the law which is stored does not match the identity of the FMU then it will read the fuel control law from the device 18 and use the newly read law to replace the existing law stored in the EEC.

It will be understood that where the FMU is a dual channel FMU then calibration data in relation to both channels will be stored separately in the memory device 18, and in effect the EEC will be updated with a lane A fuel control law and a lane B fuel control law. Because both fuel control laws are stored and updated separately it will be understood that it is not essential for the lane A fuel control law to be identical to the lane B fuel control law. Thus the need for a dual channel position sensor in which both channels are of very close tolerance and substantially identical response, is avoided, and low cost position sensors can be utilised.

The provision of a memory device in conjunction with each FMU allows the implementation of other advantages. Currently, when an FMU is taken out of service for maintenance the maintenance operative has no way of knowing the service life of the FMU, or details of any faults which may have been detected in the operation of the FMU during its previous service life. The operative can obtain this information either by a download of data stored in the associated EEC or by consulting a manual maintenance log, but since both of these may well be in the associated aircraft, then the maintenance operative must obtain the information when he removes the FMU from service for maintenance. However, where the FMU has a memory device 18 which can be written to by the EEC, then the memory device can store fault code information relevant to operational faults of the FMU detected by the EEC during the previous service interval, and/or the memory device can store data identifying the length of time during which the FMU has been in service. Since this data is carried by the memory device of the FMU, then when an FMU is removed from an engine control system, to a location remote from the EEC, for maintenance, the relevant data can be obtained from the FMU by the maintenance operative, using a memory device reader at the maintenance location, without the need to refer back to a manual log, or the EEC of the fuel supply system. It will be recognised that a maintenance operative can, if desired, be provided with a portable reader to permit the memory device to be read with the FMU in situ if maintenance of the FMU is to be performed without removing the FMU from the engine fuel system if it is inconvenient to read the device 18 using the EEC.

It will be recognised that while it is desirable for the memory device to be capable of being read, and written to, by the associated engine controller and for the memory device 18 to carry the FMU's calibration data and to be updateable in relation to service data, it is possible that these features can be used independently of one another. Thus in one embodiment of the invention the memory device 18 cannot be written to by the EEC, and carries only the calibration data of the FMU. In another embodiment the memory device 18 can be written to by the EEC, and the memory device carries only service data relating to the FMU written thereto by the engine controller, and identification data identifying the FMU. The service data may simply be data identifying the length of time that the FMU has been in operation, or alternatively may simply be fault codes indicative of faults detected by the engine controller during a previous operational period. Desirably however the memory 18 will contain FMU calibration data and will be capable of being written to by the associated engine controller to store EEC and FMU identification data and FMU service data. The ability to signal the identity of the FMU to the EEC is advantageous in that it allows the EEC to confirm, for example after service replacement of parts, the FMU in situ is suitable for operation in conjunction with the software release which is being run by the EEC.

As mentioned previously structural details of the FMU are not of importance to the present invention provided it is recognised that the FMU carries with it a memory device 18. Similarly the construction of the remainder of the fuel supply system is not of particular importance to the invention. It can be seen in the accompanying drawings that fuel from a supply 14 is pumped by a low pressure pump 21 through a main filter 22 to the inlet of a high pressure pump 23. The output from the high pressure pump 23 is fed into the FMU 11 where it first passes through a flow wash filter for supply to the input of the metering valve 12. A main filter by-pass arrangement 23 allows fuel to by-pass the main filter in the event that the filter becomes blocked, and it will be recognised by the skilled man that the arrangement for supplying fuel to the FMU 11 can take a number of different forms to suit different applications.

In practice desirably the solid state memory device 18 (conveniently an EEPROM package) will be positioned on a cool region the FMU (or integrated FMU/pumping arrangement) in order to maintain an acceptable operating temperature. A convenient EEPROM for the memory device 18 is a serial EEPROM, for example an "Atmel 24C16". The currently preferred EEPROM ("Atmel 24C16") provides 16 kbits (2 k×8 bytes) of data storage. This amount of storage readily accommodates the storage of dual channel data relating to the calibration of the channels of the FMU and also the storage of fault codes, FMU and EEC identification data, and FMU operating hours.

It will be recognised that the use of calibration data stored in the device 18 and used to update the fuel control law of the associated EEC has far-reaching advantages by comparison with the conventional FMU. These advantages include:

Low-cost, position sensors can be used in association with the metering valve. While the output of each position transducer must be repeatable, it does not need to be accurate in absolute terms.

Where the FMU makes use of dual channel control and sensing then it is not necessary to match the outputs of both channels since the memory device 18 will store calibration data for both channels and will in effect update the associated engine controller with the respective fuel control law for each channel.

The accuracy of machining of the metering profile of the metering orifice of the metering valve can be relaxed.

Labour intensive calibration of each FMU to match a predetermined fuel control law is avoided leading to much reduced calibration times.

Accuracy of manufacture of components of the FMU associated with the metering valve and other components associated with the metering process can be relaxed.

In-service changes to the FMU, which will result in changes to its calibration are accommodated automatically without expensive changes to the high integrity software being run by the EEC.

The invention claimed is:

1. A dual channel aircraft gas turbine engine fuel metering unit (FMU) comprising a fuel metering valve having first and second position transducers associated therewith each being arranged to provide an output signal for a respective channel of the fuel metering unit, the FMU incorporating a memory device for separately storing calibration data relevant to the performance of the FMU as indicated by each of the first and second transducers, and an electrical connection arrangement whereby data can be read from said memory device in use by an associated electronic engine controller (EEC).

2. A fuel metering unit as claimed in claim 1 wherein the memory device additionally stores identification data identifying the FMU.

3. A fuel metering unit as claimed in claim 1, wherein the memory device comprises two memory devices arranged in parallel.

4. A fuel metering unit as claimed in claim 1, wherein the memory device additionally stores data relevant to the health and service life of the FMU, the electrical connection arrangement permitting data to be read from and/or written to the memory device by the EEC.

5. A fuel metering unit as claimed in claim 4, wherein the memory device additionally stores service data of the FMU.

6. A fuel metering unit as claimed in claim 5, wherein said service data includes fault codes written to the FMU by the associated EEC and readable from the memory device during maintenance of the FMU remote from the EEC.

7. A fuel metering unit as claimed in claim 5, wherein said service data comprises the cumulative hours of operation of the FMU written to the memory device during operation of the FMU, by the associated EEC, and readable from the memory device during maintenance of the FMU remote from the EEC.

8. An aircraft gas turbine engine fuel supply system incorporating an FMU as specified in claim 1 and an electronic engine controller (EEC)(so connected to the FMU as to be able to read from said memory device.

9. An aircraft gas turbine engine fuel metering unit (FMU) incorporating a memory device for storing data relevant to at least one of the performance, the identification, the health and the service life of that FMU, and an electrical connection arrangement whereby data can be read from and/or written to said memory device in use by an associated electronic engine controller, and wherein said service data includes fault codes written to the FMU by the associated EEC and readable from the memory device during maintenance of the FMU remote from the EEC.

10. A fuel metering unit as claimed in claim 9 wherein, in use, the memory device contains stored performance data in the form of calibration data of the FMU.

11. A fuel metering unit as claimed in claim 10 wherein, in use, the memory device also stores service data of the FMU.

12. A fuel metering unit as claimed in claim 11 wherein, in use, the memory device additional stores a code identifying its FMU.

13. An aircraft gas turbine engine fuel supply system incorporating an FMU as claimed in claim 9 and an electronic engine controller (EEC) so connected to the FMU as to be able to read from and/or write to said memory device.

14. An aircraft gas turbine engine fuel supply system as claimed in claim 13 wherein said memory device, in use, contains stored calibration data of the FMU and can be read by the EEC.

15. An aircraft gas turbine engine fuel metering unit (FMU) incorporating a memory device for storing data relevant to at least one of the performance, the identification, the health and the service life of that FMU, and an electrical connection arrangement whereby data can be read from and/or written to said memory device in use by an associated electronic engine controller, and wherein said service data comprises the cumulative hours of operation of the FMU written to the memory device during operation of the FMU, by the associated EEC, and readable from the memory device during maintenance of the FMU remote from the EEC.

16. A fuel metering unit as claimed in claim 15 wherein, in use, the memory device contains stored performance data in the form of calibration data of the FMU.

17. A fuel metering unit as claimed in claim 16 wherein, in use, the memory device also stores service data of the FMU.

18. A fuel metering unit as claimed in claim 17 wherein, in use, the memory device additional stores a code identifying its FMU.

19. An aircraft gas turbine engine fuel supply system incorporating an FMU as claimed in claim 15 and an electronic engine controller (EEC) so connected to the FMU as to be able to read from and/or write to said memory device.

20. An aircraft gas turbine engine fuel supply system as claimed in claim 19 wherein said memory device, in use, contains stored calibration data of the FMU and can be read by the EEC.

* * * * *